Patented Jan. 6, 1942

2,269,402

UNITED STATES PATENT OFFICE 2,269,402

METHOD OF PURIFYING ETHYL LACTATE

Farris S. Swackhamer, New York, N. Y., assignor to American Cyanamid Company, New York, N. Y., a corporation of Maine No Drawing. Application July 17, 1940, Serial No. 346,057

5 Claims. (Cl. 260—484)

The present invention relates to a method of purifying ethyl lactate and is more specifically concerned with the reduction of its soluble metal content.

Ethyl lactate is a very common ingredient of coating compositions and in many instances an exceptional purity is required.

Among the detrimental substances occurring in the final product are certain soluble metallic constituents, such as iron and copper. Even though care is exercised to prevent the building up of these undesirable impurities, yet many times they exist in the final product. Even as little as five or ten parts per million are objectionable from the standpoint of some uses of ethyl lactate. The principal object of the invention, therefore, is to provide a method for the treatment of ethyl lactate to lower or reduce the content of these undesirable metallic constituents and notably iron and copper below the point where they are detrimental.

To this end, the invention contemplates adding to ethyl lactate oxalic acid in an amount sufficient to react with the iron and copper contained therein and under such conditions as to form the corresponding oxalate. These substances being insoluble in ethyl lactate are precipitated therein and may be removed therefrom by a simple filtering operation.

It is preferable to add the oxalic acid in some cases over that required theoretically to unit with the metallic constituents.

It is also desirable that temperature conditions be such as to foster the oxalate formation. Temperatures from 20° to 90° C. have been found to be eminently satisfactory.

The ordinary method of purification of esters involves blowing with air in the presence of carbon black while the temperature of the ester is held between 60° and 90° C. This treatment is for the purpose of removing non-volatiles and destroying of objectionable coloring matter. It has been found, therefore, that if requisite amounts of oxalic acid are added during this treatment that substantially all the copper and iron impurities precipitate as oxalates and may be filtered therefrom during the carbon black removal step. As the blowing period may require as long as three hours, this has been found to be an ample length of time for oxalate formation.

An ethyl lactate containing 2.5 parts per million of iron and 0.9 part per million of copper was subjected to air blowing for three hours in the presence of 3% Darco at a temperature of from 60° to 90° C. During the treatment, as little as .00744% oxalic acid was added. This had the effect of reducing the iron to .25 part per million and the copper to .12 part per million. The analysis was made after filtration at the end of the treatment.

Under the same conditions, .02% oxalic acid reduced the iron to from 3.1 to .17 parts per million and the copper from 4.7 to .05 parts per million.

From the above, it will be noted that the presence of oxalic acid is particularly effective in reducing the soluble metal content under the above conditions.

While the invention has been described with particular reference to specific embodiments, it is to be understood that it is not to be limited thereto but is to be construed broadly and restricted solely by the scope of the appended claims.

I claim:

1. A method of removing soluble iron and copper impurities from ethyl lactate which includes the step of reacting said metal constituents with oxalic acid and filtering off the insoluble metallic oxalates.

2. The method of claim 1 in which the oxalic acid is added in excess of an amount theoretically required to react with the metal impurities.

3. The method of claim 1 in which the lactate is heated to from 20° to 90° C. during the oxalate formation.

4. A method of purifying ethyl lactate containing soluble iron and copper impurities and objectionable coloring matter, which includes the steps of adding to the ethyl lactate sufficient oxalic acid to react with the iron and copper impurities, adding carbon black, and blowing air through the mixture until the soluble iron and copper impurities have been converted to insoluble oxalates and the objectionable color has been destroyed, and simultaneously filtering the carbon black and insolubles.

5. The method of claim 4 in which the ethyl lactate is heated to from 60 to 90° C. during the treatment.

FARRIS S. SWACKHAMER.